United States Patent [19]

Scarton et al.

[11] 4,300,033
[45] Nov. 10, 1981

[54] REDUCED OPERATING NOISE NOZZLE FOR ELECTRIC ARC CUTTING DEVICE

[75] Inventors: Henry A. Scarton, Troy, N.Y.; Warren C. Kennedy, Pittsburgh, Pa.; John F. McDonald, Clifton Park, N.Y.

[73] Assignee: Rensselaer Polytechnic Institute, Troy, N.Y.

[21] Appl. No.: 48,387

[22] Filed: Jun. 14, 1979

[51] Int. Cl.³ ............... B23K 9/16; B23P 1/00; B23K 9/28
[52] U.S. Cl. .................. 219/70; 219/68; 219/69 R; 219/137.42; 219/138; 239/DIG. 7
[58] Field of Search .......... 219/70, 68, 69 R, 74, 219/75, 137.42, 138, 140, 141, 144; 239/433, DIG. 7

[56] References Cited

U.S. PATENT DOCUMENTS

| | | | |
|---|---|---|---|
| 3,238,349 | 3/1966 | Anderson et al. | 219/75 |
| 3,270,179 | 8/1966 | Russell | 219/74 |
| 3,575,568 | 3/1971 | Tateno | 219/75 |
| 3,624,339 | 11/1971 | Jenkins | 219/70 |
| 3,833,787 | 9/1974 | Couch, Jr. | 219/75 X |
| 3,937,915 | 2/1976 | Matsuo et al. | 219/68 |
| 3,984,054 | 10/1976 | Frochaux | 239/DIG. 7 |
| 4,166,209 | 8/1979 | Rieppel et al. | 219/70 |
| 4,195,780 | 4/1980 | Inglis | 239/433 X |

FOREIGN PATENT DOCUMENTS

| | | | |
|---|---|---|---|
| 1039675 | 9/1958 | Fed. Rep. of Germany | 219/74 |
| 2813804 | 10/1978 | Fed. Rep. of Germany | 219/70 |

*Primary Examiner*—B. A. Reynolds
*Assistant Examiner*—Keith E. George
*Attorney, Agent, or Firm*—McGlew and Tuttle

[57] ABSTRACT

A reduced operating noise nozzle for a cutting device using at least one electrode and an electric arc to cut material of a workpiece, comprises, a nose end piece disposed around the electrode which has an outer surface tapered from an outer relatively wide diameter end inwardly toward a smaller diameter end which faces the workpiece to be cut. Compressed air is directed in a substantially annular flow path along the tapered surface of the nose piece from the wide diameter end toward the smaller diameter end thereof. Noise which would have emanated from the nozzle, especially when the material of the workpiece which is melted by the arc is blown away to effect the cutting operation, will be greatly reduced.

5 Claims, 4 Drawing Figures

REDUCED OPERATING NOISE NOZZLE FOR ELECTRIC ARC CUTTING DEVICE

FIELD AND BACKGROUND OF THE INVENTION

The present invention relates to electric arc welders and cutters in general and, in particular, to a new and useful arc cutting method and to a reduced operating noise nozzle for a cutting device using an electrode and an electric arc to cut material of a workpiece and which comprises a tapered nose piece disposed around the electrode and a source of compressed air or other gas connected to the nose piece for directing a substantially annular flow of air or gas along the tapered surface of the nose piece and toward the workpiece.

DESCRIPTION OF THE PRIOR ART

Devices are known for cutting material, and particularly metals, by using an electrode, whereby, an arc is established between the electrode and the metal to be cut to melt portions of the metal. Compressed air sources may be combined with the metal cutting device for blowing away portions of the metal which have been melted by the arc and thereby cutting the material. Devices are also known where two electrodes are used, and the arc is established between these two electrodes. In such devices, the arc can be positioned adjacent the workpiece for melting the material of the workpiece and for producing a cut therein.

An ARC-AIR nozzle is known which utilizes very high velocity and concentrated jets of air for removing molten material melted by an electric arc. The high velocity of the jets is necessary to ensure a sufficient air flow in the vicinity of the arc to blow the molten metal away. The velocity of air in the immediate vicinity of the workpiece, however, is substantially reduced from the velocity of the initial jet. This reduction in air velocity is due to mixing and entraining of surrounding air by the air jets. In known devices, the high velocity jets produce extremely high noise levels which can be a threat to the health or hearing of a worker utilizing the device after prolonged exposure. A reduction of the velocity, while reducing the noise levels, would hinder the effectiveness of the device so that high velocities for the jets must be maintained.

A reference which is relevant to the present invention is U.S. Pat. No. 3,937,915 to Matsuo et al. Matsuo discloses a device which provides a stream of compressed air and water to the vicinity of an electrode tip.

Another reference which is relevant to the invention is U.S. Pat. No. 3,878,354 to Frantzreb, Sr., which discloses a tapered nozzle which surrounds an electrode. The nozzle in Frantzreb, Sr. is used to direct gases from the region of an arc upwardly along the tapered surface of the nozzle to a return flow system. This device is concerned primarily with the removal of fumes from the area of the arc.

SUMMARY OF THE INVENTION

The present invention is a nozzle for a cutting device which uses an electrode and an arc to melt material of a workpiece and thereby cut the workpiece, which comprises a tapered nose piece which surrounds the electrode and is tapered toward an end thereof which faces a workpiece to be cut. The nose piece is seated within a nozzle body into which compressed air or other gas can be supplied. An annular compressed gas chamber is defined between the nozzle body and a large diameter portion of the nose piece. Air under pressure is supplied to the annular chamber and is directed so that it is confined for flow along the tapered surface of the nose piece and toward its small diameter tapered end. The air or gas thus flows substantially annularly down along the tapered nose piece and then along the electrode and toward the workpiece.

In operation, when the annular air flow is directed along the tapered nose piece, additional air which is in the vicinity of the nose piece is entrained toward the electrode and workpiece. The volume of air flow, therefore, in the vicinity of the electrode, is increased due to the so-called Coanda effect. By entraining additional air surrounding the nose piece, the initial velocity of the gas flow from the nozzle body can be substantially reduced, thereby, substantially reducing the noise level of the device in operation.

The nozzle body with attached nose piece can be carried between the jaws of an electrode holder. The lower jaw of the electrode holder may be provided with an insert piece for directing compressed air supplied to the lower jaw into the nozzle body. The upper jaw may be provided with an electrode contact for abutment against the electrode which can be inserted through the nose piece and nozzle body.

In one embodiment of the invention, an annular gas chamber is defined between the nozzle body and the nose piece, and the large diameter portion of the nose piece is provided with a plurality of circumferentially spaced grooves which define a plurality of circumferentially spaced axially aligned gas passages for producing the substantially annular gas flow. In another embodiment of the invention, the gas passages are disposed at an angle to the major axis of the nose piece so that a spin or rotation is imparted to the annular gas flow to increase its effect at blowing away melted workpiece material.

Accordingly, an object of the present invention is to provide a reduced noise nozzle for a cutting device using at least one electrode and an electric arc for melting material of a workpiece to cut the workpiece, comprising, flow defining means disposed around an electrode of the device having an outer surface tapered from a large diameter end spaced from the arc to a small diameter end facing the arc, and compressed gas means associated with said flow defining means for directing a substantially annular flow of gas from said large diameter end along said outer surface toward said small diameter end, whereby, said gas flow entrains additional air around said outer surface toward the arc to blow material melted by the arc away and cut the workpiece.

Another object of the present invention is to provide a reduced noise nozzle for a cutting device, comprising, a nozzle body, compressed air means connected to the nozzle body for supplying compressed air thereto, a tapered nose piece connected to said nozzle body and defining an annular chamber therebetween, compressed air being supplied to said annular chamber, said nose piece including a large diameter portion adjacent said nozzle body and a small diameter end spaced from the nozzle body, said large diameter portion including a plurality of circumferentially spaced grooves defining a plurality of gas passages with said nozzle body, said gas passages communicating with said annular chamber, said nose piece including a tapered outer surface between said large diameter portion and said small diameter end, whereby, compressed air is directed from said annular chamber through said gas passages and along said outer tapered surface.

A further object of the invention is to provide a method of operating a cutting arc electrode nozzle to reduce the noise of operation thereof on a workpiece by comprising, directing air in an annular flow path directly surrounding the nozzle and downwardly along the nozzle in an inwardly tapering annular flow pattern toward the workpiece, thereby to increase the quantity of air at the workpiece and the tip of the electrode and to reduce aerodynamic jet noise.

Still another object of the invention is to provide a reduced operating noise nozzle for an electric arc cutting device which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
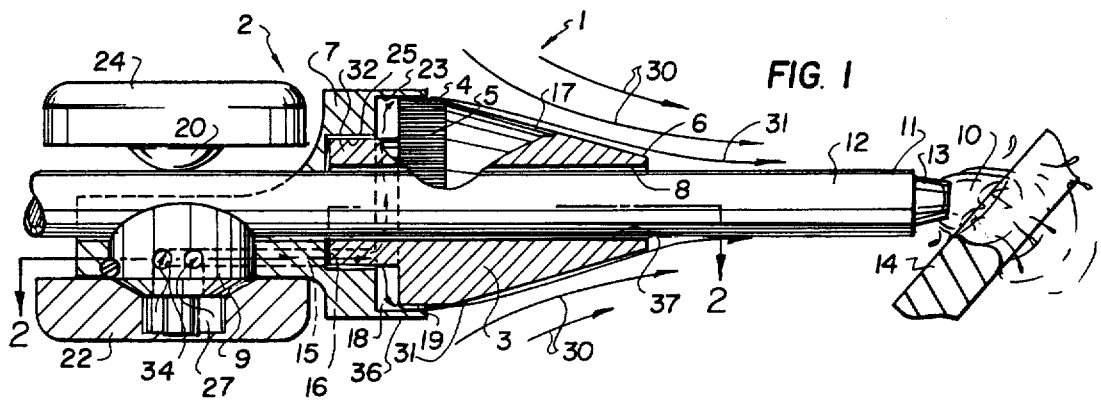
FIG. 1 is a side sectional elevational view of one embodiment of the invention.
Figure 2:
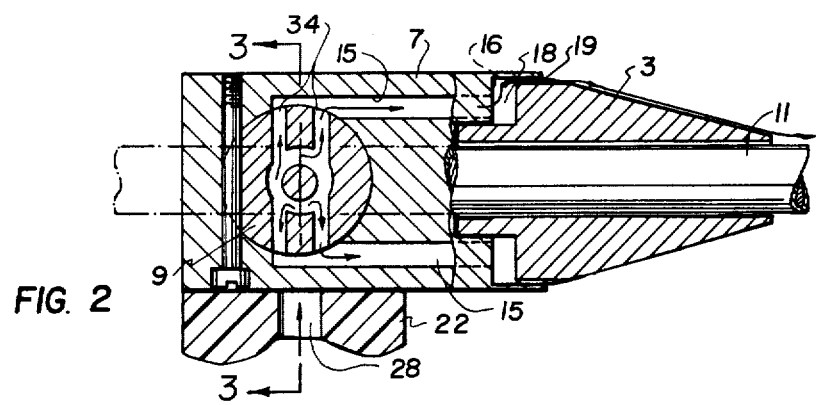
FIG. 2 is a view taken along lines 2—2 of FIG. 1.
Figure 3:
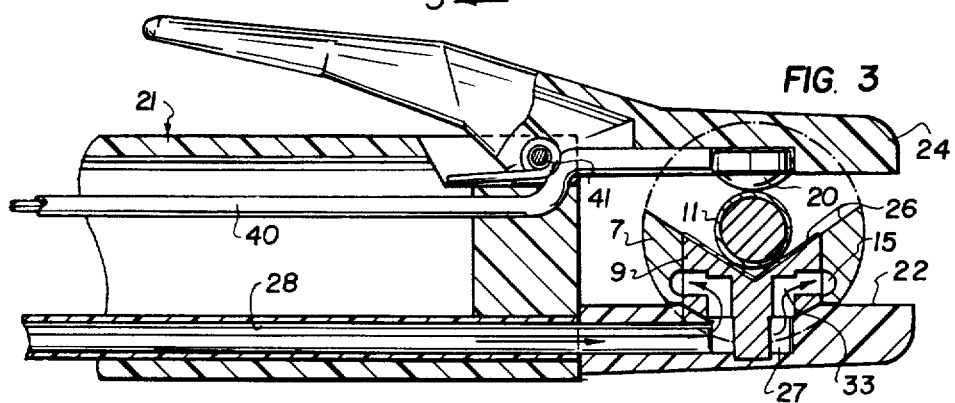
FIG. 3 is a view taken along the line 3—3 of FIG. 2.

Referring now to the drawings in particular, the invention embodied therein in FIGS. 1 to 3, comprises, a reduced noise nozzle, generally designated 1, for a cutting device, generally designated 2, having an electrode 11 through which electricity is passed to form an arc 10 with the surface of a workpiece 14. Air is caused to flow in a confined annular flow path proceeding in a direction of arrows 30 toward the arc 10, thereby blowing material of the workpiece 14 which has been melted by the arc 10 away from the arc area to form a cut in the workpiece 14.

Nozzle 1 comprises flow defining means in the form of a tapered or conical nose piece 3, having a large diameter end 4, a small diameter end 6, and a tapered outer surface 17 extending therebetween. Nose piece 3 tapers inwardly in the direction of the arc 10.

Nozzle 1 also includes a nozzle body 7 having an annular recess 23 and a bore 25. Nose piece 3 includes an extension portion 32 which is inserted into bore 25 of the nozzle body 7. Extension portion 32 is of a length sufficient so that a chamber 18 is defined between the recess 23 of nozzle body 7 and the nosepiece 3.

Compressed air or a gas, useful in the cutting process, is supplied to a first electrode holder arm 22 through a passage 28 (FIG. 3). Passage 28 communicates with a compressed air or gas chamber 27 in the first or lower electrode holder arm 22 which in turn communicates with passages 33 of an insert 9. Passages 33 in insert 9 terminate at openings 34 which communicate with air slots 15 in the nozzle body 7. Slots 15 communicate with annular chamber 18. Nose piece 3 is provided with a plurality of circumferentially spaced grooves 5 adjacent the large diameter end 4.

Grooves 5 cooperate with a rim portion 36 of nozzle body 7 to form a plurality of circumferentially spaced gas or air passages 19. Grooves 5 may be aligned with the major axis of the nose piece 3, as shown in FIG. 1, or may be at an angle thereto as shown at 5' in FIG. 4. In either embodiment, compressed air supplied to annular chamber 18 is directed through gas or air passages 19 and 19', and outwardly along outer tapered surface 17. The substantially annular gas or air flow thereby produced which is indicated by arrows 31, entrains additional air which surrounds the nose piece 3 in the vicinity of the direction of arrows 30. The annular gas flow 31 is maintained in close proximity to the tapered outer surface 17 by the ambient pressure of the surrounding atmosphere utilizing the so-called Coanda effect, and the additional surrounding air is entrained and directed along the electrode 11 and toward the arc 10.

Figure 4:
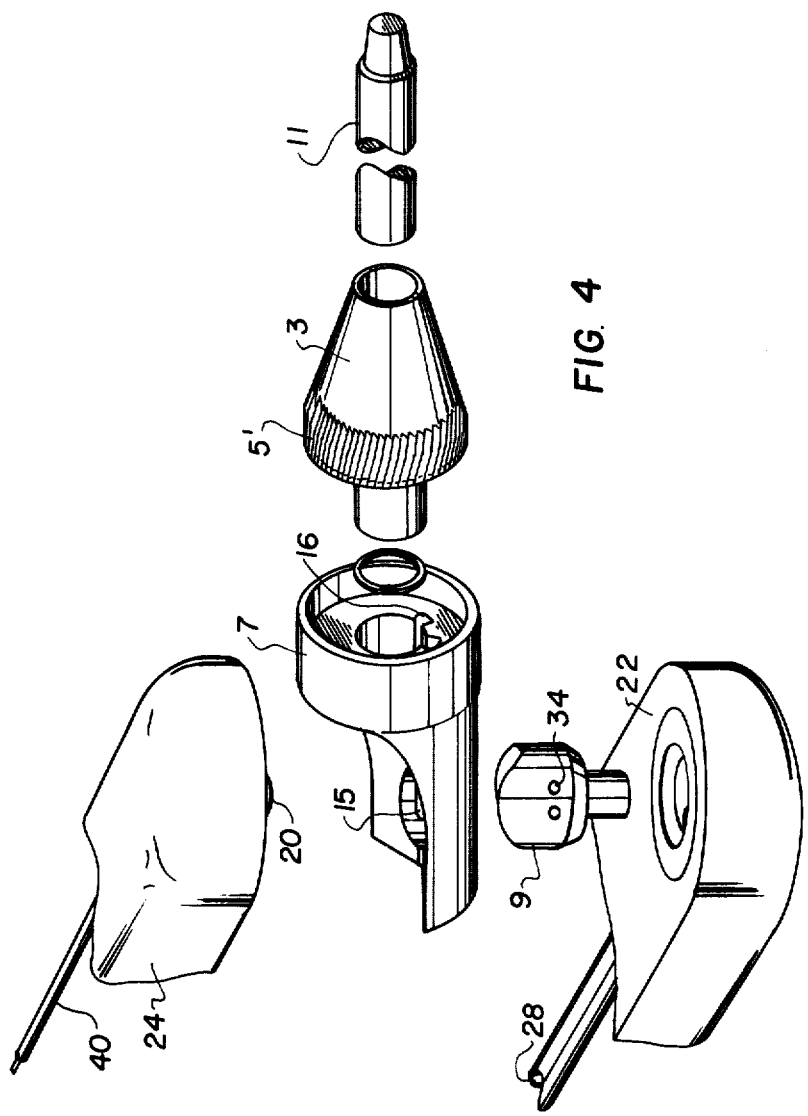
FIG. 4 is an exploded view of an embodiment similar to that shown in FIG. 1, with gas passages defined on the nose piece positioned at an angle to the major axis of the device.

In the embodiment shown in FIG. 4, grooves 5' are disposed at an angle to the major axis of the nose piece so that they impart a slight spinning or rotation of the annular gas flow 31, thereby, enhancing the entrainment of additional air.

In operation, an electrode 11 which comprises, for example, a metal sheath 12, covering a carbon core 13, is inserted into a bore 37 of the nose piece 3 and through the nozzle body 7. Electricity for the cutting operation is applied through a line 40 of the second or upper electrode holder arm or jaw 24. First and second electrode holder arms 22 and 24 are connected to each other through a spring-loaded pivot joint 41 to form an electrode holder 21. Second or upper electrode holder arm 24 is provided with an electrode contact 20 which is connected to the line 40.

Air channel insert 9 may be made of copper and comprise a lower contact which cooperates with the contact 20 to grasp the electrode 11 through the action of springloaded joint 41. In the embodiment shown, the top surface of insert 9 and the surrounding area of the holder 7 is designed as a V-shaped trough 26 to securely cradle the rod 11 and hold it in position to make a reliable electrical contact between the line 40 and the rod 11. Insert 9 may also act as a contact and be additionally or alternatively connected to power line 40.

To complete the circuit for forming arc 10, a power line is also connected to the workpiece 14 which is usually in the form of clamping jaws (not shown).

It has been found that the provision of an annular air or gas flow 31 along a tapered surface 17 toward the arc 10 advantageously entrains relatively large masses of surrounding air 30, even when annular air flow 31 is supplied at a substantially reduced velocity as compared with the prior known structures. This substantial reduction in air velocity reduces the noise which is produced by the invention in operation.

Directing air in an annular flow in a converging flow path has the effect both of increasing the amount of air in contact with the electrode tip and also reducing the amount of aerodynamic jet noise. The method of the invention is particularly suitable for metal gouging. The maintainence of this annular air flow causes the entrainment of the surrounding air and materially reduces operating noise. The method utilizes the so-called Coanda effect to keep the flow concentrated in the vicinity of the electrode and the workpiece.

While specific embodiments of the invention have been shown and described in detail to illustrate the application of the principles of the invention, it will be understood that the invention may be embodied otherwise without departing from such principles.

What is claimed is:

1. A reduced operating noise nozzle for a cutting device using at least one electrode and an electric arc for melting material of a workpiece to cut the workpiece and compressed gas to blow the melted material away, comprising, flow defining means disposed around an electrode of the device which leaves an end of the electrode exposed, said flow defining means having an outer surface surrounded with air and tapered from a large diameter end spaced from the arc at the electrode exposed end to a small diameter end facing the arc, and pressure gas means associated with said flow defining means for directing a substantially annular flow of gas from said large diameter end along said outer surface toward said small diameter end, whereby the gas flow entrains the air surrounding said outer tapered surface and directs the air toward the arc for blowing material away which has been melted by the arc, said flow defining means comprising a tapered nose piece having a large diameter end and a small diameter end, a nozzle body connected to said nose piece adjacent said large diameter end, said nozzle body including a recess and an annular gas chamber defined between said recess and said nose piece, and means between said large diameter end of said nose piece and said nozzle body defining gas passages communicating with said annular chamber, said small diameter end of said nose piece being slightly larger than the diameter of the electrode and said outer tapered surface being substantially continuous with an outer surface of the electrode to form said annular gas flow toward the arc.

2. A reduced operating noise nozzle, as claimed in claim 1, wherein said means defining said gas passages comprise a plurality of circumferentially spaced grooves in said nose piece adjacent its large diameter end.

3. A reduced operating noise nozzle, as claimed in claim 2, wherein said grooves extend parallel to the major axis of said nose piece.

4. A reduced operating noise nozzle, as claimed in claim 2, wherein each of said grooves extends at an angle to the major axis of said nose piece to cause a spin in the annular gas flow along said outer tapered surface.

5. A method of operating an arc electrode and nozzle using compressed air for gouging a metal workpiece so as to reduce the noise of operation thereof and to reduce the noise of cutting away the workpiece comprising: directing air in an annular flow path directly surrounding the nozzle over the surface of the nozzle and downwardly along the nozzle in a confined annular inwardly tapering flow path over a contiguous outer surface of the electrode toward the workpiece so as to increase the quantity of air at the workpiece and the tip of the electrode by entraining additional air surrounding the electrode and nozzle to reduce aerodynamic jet noise, and leaving the space surrounding the electrode and nozzle free.

* * * * *